US009129600B2

(12) United States Patent
Gibbs et al.

(10) Patent No.: US 9,129,600 B2
(45) Date of Patent: Sep. 8, 2015

(54) METHOD AND APPARATUS FOR ENCODING AN AUDIO SIGNAL

(71) Applicant: MOTOROLA MOBILITY LLC, Libertyville, IL (US)

(72) Inventors: Jonathan A. Gibbs, Windemere (GB); Holly L. Francois, Guildford (GB)

(73) Assignee: Google Technology Holdings LLC, Mountain View, CA (US)

(*) Notice: Subject to any disclaimer, the term of this patent is extended or adjusted under 35 U.S.C. 154(b) by 328 days.

(21) Appl. No.: 13/626,923

(22) Filed: Sep. 26, 2012

(65) Prior Publication Data

US 2014/0088973 A1 Mar. 27, 2014

(51) Int. Cl.

| | |
|---|---|
| ***G06F 15/00*** | (2006.01) |
| ***G10L 19/02*** | (2013.01) |
| ***G10L 21/00*** | (2013.01) |
| ***G10L 25/90*** | (2013.01) |
| ***G10L 19/00*** | (2013.01) |
| ***G10L 15/00*** | (2013.01) |
| ***G10L 21/04*** | (2013.01) |
| ***G10L 19/20*** | (2013.01) |
| *G10L 25/81* | (2013.01) |

(52) U.S. Cl.

CPC *G10L 19/20* (2013.01); *G10L 25/81* (2013.01)

(58) Field of Classification Search

CPC .... H05K 999/99; G10L 19/12; G10L 19/008; G10L 21/04; G10L 15/08

USPC .................................. 704/200–500; 381/107

See application file for complete search history.

(56) References Cited

U.S. PATENT DOCUMENTS

| | | | |
|---|---|---|---|
| 4,560,977 | A | 12/1985 | Murakami et al. |
| 4,670,851 | A | 6/1987 | Murakami et al. |
| 4,727,354 | A | 2/1988 | Lindsay |
| 4,853,778 | A | 8/1989 | Tanaka |
| 5,006,929 | A | 4/1991 | Barbero et al. |
| 5,067,152 | A | 11/1991 | Kisor et al. |
| 5,327,521 | A | 7/1994 | Savic et al. |

(Continued)

FOREIGN PATENT DOCUMENTS

| | | |
|---|---|---|
| EP | 0932141 A2 | 7/1999 |
| EP | 1483759 B1 | 8/2004 |

(Continued)

OTHER PUBLICATIONS

Pulakka et al., "Evaluation of an Artificial Speech Bandwidth Extension Method in Three Languages," IEEE Transactions on Audio, Speech, and Language Processing, vol. 16, No. 6, Aug. 2008.*

(Continued)

*Primary Examiner* — Pierre-Louis Desir
*Assistant Examiner* — Anne Thomas-Homescu
(74) *Attorney, Agent, or Firm* — Birch, Stewart, Kolasch & Birch, LLP

(57) ABSTRACT

A hybrid speech encoder detects changes from music-like sounds to speech-like sounds. When the encoder detects music-like sounds (e.g., music), it operates in a first mode, in which it employs a frequency domain coder. When the encoder detects speech-like sounds (e.g., human speech), it operates in a second mode, and employs a time domain or waveform coder. When a switch occurs, the encoder backfills a gap in the signal with a portion of the signal occurring after the gap.

12 Claims, 4 Drawing Sheets

(56) References Cited

U.S. PATENT DOCUMENTS

| | | | | |
|---|---|---|---|---|
| 5,394,473 | A | 2/1995 | Davidson | |
| 5,956,674 | A | 9/1999 | Smyth et al. | |
| 6,108,626 | A | 8/2000 | Cellario et al. | |
| 6,236,960 | B1 | 5/2001 | Peng et al. | |
| 6,253,185 | B1 | 6/2001 | Arean et al. | |
| 6,263,312 | B1 | 7/2001 | Kolesnik et al. | |
| 6,304,196 | B1 | 10/2001 | Copeland et al. | |
| 6,453,287 | B1 | 9/2002 | Unno et al. | |
| 6,493,664 | B1 | 12/2002 | Uday Bhaskar et al. | |
| 6,504,877 | B1 | 1/2003 | Lee | |
| 6,593,872 | B2 | 7/2003 | Makino et al. | |
| 6,658,383 | B2 | 12/2003 | Koshida et al. | |
| 6,662,154 | B2 | 12/2003 | Mittal et al. | |
| 6,680,972 | B1 * | 1/2004 | Liljeryd et al. | 375/240 |
| 6,691,092 | B1 | 2/2004 | Udaya Bhaskar et al. | |
| 6,704,705 | B1 | 3/2004 | Kabal et al. | |
| 6,813,602 | B2 | 11/2004 | Thyssen | |
| 6,895,375 | B2 * | 5/2005 | Malah et al. | 704/219 |
| 6,940,431 | B2 | 9/2005 | Hayami | |
| 6,975,253 | B1 | 12/2005 | Dominic | |
| 7,031,493 | B2 | 4/2006 | Fletcher et al. | |
| 7,130,796 | B2 | 10/2006 | Tasaki | |
| 7,161,507 | B2 | 1/2007 | Tomic | |
| 7,180,796 | B2 | 2/2007 | Tanzawa et al. | |
| 7,212,973 | B2 | 5/2007 | Toyama et al. | |
| 7,230,550 | B1 | 6/2007 | Mittal et al. | |
| 7,231,091 | B2 | 6/2007 | Keith | |
| 7,414,549 | B1 | 8/2008 | Yang et al. | |
| 7,461,106 | B2 | 12/2008 | Mittal et al. | |
| 7,761,290 | B2 | 7/2010 | Koishida et al. | |
| 7,840,411 | B2 | 11/2010 | Hotho et al. | |
| 7,885,819 | B2 | 2/2011 | Koishida et al. | |
| 7,889,103 | B2 | 2/2011 | Mittal et al. | |
| 8,423,355 | B2 * | 4/2013 | Mittal et al. | 704/203 |
| 8,442,837 | B2 * | 5/2013 | Ashley et al. | 704/501 |
| 8,577,045 | B2 * | 11/2013 | Gibbs | 381/23 |
| 8,639,519 | B2 * | 1/2014 | Ashley et al. | 704/500 |
| 8,725,500 | B2 * | 5/2014 | Gibbs et al. | 704/219 |
| 8,868,432 | B2 * | 10/2014 | Gibbs et al. | 704/500 |
| 2002/0052734 | A1 | 5/2002 | Unno et al. | |
| 2003/0004713 | A1 | 1/2003 | Makino et al. | |
| 2003/0009325 | A1 * | 1/2003 | Kirchherr et al. | 704/211 |
| 2003/0220783 | A1 | 11/2003 | Streich et al. | |
| 2004/0252768 | A1 | 12/2004 | Suzuki et al. | |
| 2005/0261893 | A1 | 11/2005 | Toyama et al. | |
| 2006/0022374 | A1 | 2/2006 | Chen et al. | |
| 2006/0047522 | A1 | 3/2006 | Ojanpera | |
| 2006/0173675 | A1 * | 8/2006 | Ojanpera | 704/203 |
| 2006/0190246 | A1 | 8/2006 | Park | |
| 2006/0241940 | A1 | 10/2006 | Ramprashad | |
| 2007/0171944 | A1 | 7/2007 | Schuijers et al. | |
| 2007/0239294 | A1 | 10/2007 | Brueckner et al. | |
| 2007/0271102 | A1 | 11/2007 | Morii | |
| 2008/0065374 | A1 | 3/2008 | Mittal et al. | |
| 2008/0120096 | A1 | 5/2008 | Oh et al. | |
| 2008/0154584 | A1 * | 6/2008 | Andersen | 704/211 |
| 2009/0024398 | A1 | 1/2009 | Mittal et al. | |
| 2009/0030677 | A1 | 1/2009 | Yoshida | |
| 2009/0048852 | A1 * | 2/2009 | Burns et al. | 704/503 |
| 2009/0076829 | A1 | 3/2009 | Ragot et al. | |
| 2009/0100121 | A1 | 4/2009 | Mittal et al. | |
| 2009/0112607 | A1 | 4/2009 | Ashley et al. | |
| 2009/0234642 | A1 | 9/2009 | Mittal et al. | |
| 2009/0259477 | A1 | 10/2009 | Ashley et al. | |
| 2009/0306992 | A1 | 12/2009 | Ragot et al. | |
| 2009/0326931 | A1 | 12/2009 | Ragot et al. | |
| 2010/0049510 | A1 * | 2/2010 | Zhan et al. | 704/219 |
| 2010/0063827 | A1 * | 3/2010 | Gao | 704/500 |
| 2010/0088090 | A1 | 4/2010 | Ramabadran | |
| 2010/0169087 | A1 | 7/2010 | Ashley et al. | |
| 2010/0169099 | A1 | 7/2010 | Ashley et al. | |
| 2010/0169100 | A1 | 7/2010 | Ashley et al. | |
| 2010/0169101 | A1 | 7/2010 | Ashley et al. | |
| 2010/0217607 | A1 * | 8/2010 | Neuendorf et al. | 704/500 |
| 2010/0305953 | A1 | 12/2010 | Susan et al. | |
| 2011/0161087 | A1 | 6/2011 | Ashley et al. | |
| 2011/0202355 | A1 * | 8/2011 | Grill et al. | 704/500 |
| 2011/0218797 | A1 * | 9/2011 | Mittal et al. | 704/200 |
| 2011/0218799 | A1 * | 9/2011 | Mittal et al. | 704/203 |
| 2011/0238425 | A1 * | 9/2011 | Neuendorf et al. | 704/500 |
| 2012/0029923 | A1 * | 2/2012 | Rajendran et al. | 704/500 |
| 2012/0095758 | A1 * | 4/2012 | Gibbs et al. | 704/219 |
| 2012/0101813 | A1 * | 4/2012 | Vaillancourt et al. | 704/206 |
| 2012/0116560 | A1 * | 5/2012 | Francois et al. | 700/94 |
| 2012/0239388 | A1 * | 9/2012 | Sverrisson et al. | 704/205 |
| 2012/0265541 | A1 * | 10/2012 | Geiger et al. | 704/500 |
| 2013/0030798 | A1 * | 1/2013 | Mittal et al. | 704/219 |
| 2013/0317812 | A1 * | 11/2013 | Jeong et al. | 704/203 |
| 2013/0332148 | A1 * | 12/2013 | Ravelli et al. | 704/203 |
| 2014/0019142 | A1 * | 1/2014 | Mittal et al. | 704/500 |
| 2014/0114670 | A1 * | 4/2014 | Miao et al. | 704/500 |
| 2014/0119572 | A1 * | 5/2014 | Gao | 381/107 |
| 2014/0257824 | A1 * | 9/2014 | Taleb et al. | 704/500 |

FOREIGN PATENT DOCUMENTS

| | | | |
|---|---|---|---|
| EP | 1533789 | A1 | 5/2005 |
| EP | 1619664 | A1 | 1/2006 |
| EP | 1818911 | A1 | 8/2007 |
| EP | 1845519 | A2 | 10/2007 |
| EP | 1912206 | A1 | 4/2008 |
| EP | 1959431 | B1 | 6/2010 |
| EP | 2352147 | A2 | 8/2011 |
| WO | 9715983 | A1 | 5/1997 |
| WO | 03073741 | A2 | 9/2003 |
| WO | 2007063910 | A1 | 6/2007 |
| WO | 2010003663 | A1 | 1/2010 |

OTHER PUBLICATIONS

P. Esquef et al., "An Efficient Model-Based Multirate Method for Reconstruction of Audio Signals Across Long Gaps", IEEE Transactions on Audio, Speech, and Language Processing, vol. 14, No. 4, Jul. 2006.*

J. Princen et al., "Analysis/Synthesis Filter Bank Design Based on Time Domain Aliasing Cancellation", IEEE Transactions on Acoustics, Speech, and Signal Processing, vol. ASSP-34, No. 5, Oct. 1986.*

3GPP TS 26.290 V7.0.0 (Mar. 2007); 3rd Generation Partnership Project; Techinical Specification Group Service and System Aspects; Audio Codec Processing Functions; Extended Adaptive Multi-Rate—Wideband (AMR-WB+) Codec; Transcoding Functions (Release 7).

Chan et al.; Frequency Domain Postfiltering for Multiband Excited Linear Predictive Coding of Speech; Electronics Letters; Jun. 6, 1996, vol. 32 No. 12; 3 pages.

Chen et al.; Adaptive Postfiltering for Quality Enhancement of Coded Speech; IEEE Transactions on Speech and Audio Processing, vol. 3. No. 1, Jan. 1995; 13 pages.

Anderson et al.; Reverse Water-Filling in Predictive Encoding of Speech; Department of Speech, Music and Hearing, Royal Institute of Technology; Stockholm, Sweden; 3 pages, Jun. 20, 1999-Jun. 23, 1999.

Ramprashad, "High Quality Embedded Wideband Speech Coding Using an Inherently Layered Coding Paradigm," Proceedings of International Conference on Acoustics, Speech, and Signal Processing, ICASSP 2000, vol. 2, Jun. 5-9, 2000, pp. 1145-1148.

Ramprashad, "A Two Stage Hybrid Embedded Speech/Audio Coding Structure," Proceedings of Internationnal Conference on Acoustics, Speech, and Signal Processing, ICASSP 1998, May 1998, vol. 1, pp. 337-340, Seattle, Washington.

International Telecommunication Union, "G.729.1, Series G: Transmission Systems and Media, Digital Systems and Networks, Digital Terminal Equipments—Coding of analogue signals by methods other than PCM,G.729 based Embedded Variable bit-rate coder: An 8-32 kbit/s scalable wideband coder bitstream interoperable with G.729," ITU-T Recomendation G.729.1, May 2006, Cover page, pp. 11-18. Full document available at: http://www.itu.int/rec/T-REC-G.729.1-200605-I/en.

Kovesi, et al., "A Scalable Speech and Adiuo Coding Scheme with Continuous Bitrate Flexibility," Proceedings of the IEEE Interna-

(56) References Cited

OTHER PUBLICATIONS tional Conference on Acoustics, Speech and Signal Processing 2004 (ICASSP '04) Montreal, Quebec, Canada, May 17-21, 2004, vol. 1, pp. 273-276.
Ramprashad, "Embedded Coding Using a Mixed Speech and Audio Coding Paradigm," International Journal of Speech Technology, Kluwer Academic Publishers, Netherlands, vol. 2, No. 4, May 1999, pp. 359-372.
Mittal, et al., "Coding Unconstrained FCB Excitation Using Combinatorial and Huffman Codes," Proceedings of the 2002 IEEE Workshop on Speech Coding, Oct. 6-9, 2002, pp. 129-131.
Ashley, et al., Wideband Coding of Speech Using a Scalable Pulse Codebook, Proceedings of the 2000 IEEE Workshop on Speech Coding, Sep. 17-20, 2000, pp. 148-150.
Mittal, et al.,"Low Complexity Factorial Pulse Coding of MDCT Coefficients using Approximation of Combinatorial Functions," IEEE International Conference on Acoustics, Speech and Signal Processing, 2007, ICASSP 2007, Apr. 15-20, 2007, pp. I-289-I-292.
Makinen, et al., "AMR-WB+: A New Audio Coding Standard for 3rd Generation Mobile Audio Service," Proceedings of the IEEE International Conference on Acoustics, Speech and Signal Processing, 2005, ICASSP'05, vol. 2, Mar. 18-23, 2005, pp. ii/1109-ii/1112.
Faller, et al., "Technical Advances in Digital Audio Radio Broadcasting," Proceedings of the IEEE, vol. 90, Issue 8, Aug. 2002, pp. 1303-1333.
Salami, et al., "Extended AMR-WB for High-Quality Audio on Mobile Devices," IEEE Communications Magazine, vol. 44, Issue 5, May 2006, pp. 90-97.
Hung, et al., "Error-Resilient Pyramid Vector Quantization for Image Compression," IEEE Transactions on Image Processing, vol. 7, Issue 10, Oct. 1998, pp. 1373-1386.
Tancerel, et al., "Combined Speech and Audio Coding by Discrimination"; Proceedings of the 2000 IEEE Workshop on Speech Coding, Sep. 17-20, 2000, pp. 154-156.
Virette, et al., "Adaptive Time-Frequency Resolution in Modulated Transform at Reduced Delay", Orange Labs, France; IEEE 2008; pp. 3781-3784.
Princen, et al., "Subband/Transform Coding Using Filter Bank Designs Based on Time Domain Aliasing Cancellation", IEEE 1987 pp. 2161-2164.
B. Elder, "Coding of Audio Signals with Overlapping Block Transform and Adaptive Window Functions", Frequenz; Zeitschnft fnr Schwingungs—und Schwachstromtechnik, 1989, vol. 43, pp. 252-256.
Kim et al.; "A New Bandwidth Scalable Wideband Speech/Audio Coder" Proceedings of Proceedings of International Conference on Acoustics, Speech, and Signal Processing, ICASSP; Orlando, FL; vol. 1, May 13, 2002 pp. 657-660.
Hung et al., Error-Resilient Pyramid Vector Quantization for Image Compression, IEEE Transactions on Image Processing, 1994 pp. 583-587.
Daniele Cadel, et al. "Pyramid Vector Coding for High Quality Audio Compression", IEEE 1997, pp. 343-346, Cefriel, Milano, Italy and Alcatel Telecom, Vimercate Italy.
Markas et al. "Multispectral Image Compression Algorithms"; Data Compression Conference, 1993; Snowbird, UT USA Mar. 30-Apr. 2, 1993; pp. 391-400.
"Enhanced Variable Rate Codec, Speech Service Options 3, 68, and 70 for Wideband Spread Spectrum Digital Systems", 3GPP2 TSG-C Working Group 2, XX, XX, No. C. S0014-C, Jan. 1, 2007, pp. 1-5.
Boris Ya Ryabko et al.: "Fast and Efficient Construction of an Unbiased Random Sequence", IEEE Transactions on Information Theory, IEEE, US, vol. 46, No. 3, May 1, 2000, ISSN: 0018-9448, pp. 1090-1093.
Ratko V. Tomic: "Quantized Indexing: Background Information", May 16, 2006, URL: http://web.archive.org/web/20060516161324/www.1stworks.com/ref/TR/tr05-0625a.pdf, pp. 1-39.
Ido Tal et al.: "On Row-by-Row Coding for 2-D Constraints", Information Theory, 2006 IEEE International Symposium On, IEEE, PI, Jul. 1, 2006, pp. 1204-1208.
Ramo et al. "Quality Evaluation of the G.EV-VBR Speech Codec" Apr. 4, 2008, pp. 4745-4748.
Jelinek et al. "ITU-T G.EV-VBR Baseline Codec" Apr. 4, 2008, pp. 4749-4752.
Jelinek et al. "Classification-Based Techniques for Improving the Robustness of CELP Coders" 2007, pp. 1480-1484.
Fuchs et al. "A Speech Coder Post-Processor Controlled by Side-Information" 2005, pp. IV-433-IV-436.
J. Fessler, "Chapter 2; Discrete-time signals and systems" May 27, 2004, pp. 2.1-2.21.
Neuendorf, et al., "Unified Speech Audio Coding Scheme for High Quality oat Low Bitrates" ieee International Conference on Accoustics, Speech and Signal Processing, 2009, Apr. 19, 2009, 4 pages.
Bruno Bessette: Universal Speech/Audio Coding using Hybrid ACELP/TCX techniques, Acoustics, Speech, and Signal Processing, 2005. Proceedings. (ICASSP '05). IEEE International Conference, Mar. 18-23, 2005, ISSN : III-301-III-304, Print ISBN: 0-7803-8874-7, all pages.
Ratko V. Tomic: "Fast, Optimal Entropy Coder" 1stWorks Corporation Technical Report TR04-0815, Aug. 15, 2004, pp. 1-52.
Combesure, Pierre et al.: "A 16, 24, 32 KBIT/S Wideband Speech Codec Based on ATCELP", Proceedings ICASSP '99 Proceedings of the Acoustics, Speech, and Signal PRocessing, 1999, on 1999 IEEE International Conference, vol. 01, pp. 5-8.
Ejaz Mahfuz: "Packet Loss Concealment for Voice Transmission over IP Networks", Department of Electrical Engineering, McGill University, Montreal, Canada, Sep. 2001, A thesis submitted to the Faculty of Graduate Studies Research in Partial fulfillment of hte requirements for the degree of Master of Engineering, all pages.
Balazs Kovesi et al.: "Integration of a CELP Coder in the ARDOR Universal Sound Codec", Interspeech 2006—ICSLP Ninth International Conference on Spoken Language Processing) Pittsburg, PA, USA, Sep. 17-21, 2006, all pages.
Patent Cooperation Treaty, International Search Report and Written Opinion of the International Searching Authority for International Application No. PCT/US2013/058436, Feb. 4, 2014, 11 pages.

* cited by examiner

METHOD AND APPARATUS FOR ENCODING AN AUDIO SIGNAL

TECHNICAL FIELD

The present disclosure relates generally to audio processing, and more particularly, to switching audio encoder modes.

BACKGROUND

The audible frequency range (the frequency of periodic vibration audible to the human ear) is from about 50 Hz to about 22 kHz, but hearing degenerates with age and most adults find it difficult to hear above about 14-15 kHz. Most of the energy of human speech signals is generally limited to the range from 250 Hz to 3.4 kHz. Thus, traditional voice transmission systems were limited to this range of frequencies, often referred to as the "narrowband." However, to allow for better sound quality, to make it easier for listeners to recognize voices, and to enable listeners to distinguish those speech elements that require forcing air through a narrow channel, known as "fricatives" ('s' and 'f' being examples), newer systems have extended this range to about 50 Hz to 7 kHz. This larger range of frequencies is often referred to as "wideband" (WB) or sometimes HD (High Definition)-Voice.

The frequencies higher than the WB range—from about the 7 kHz to about 15 kHz—are referred to herein as the Bandwidth Extension (BWE) region. The total range of sound frequencies from about 50 Hz to about 15 kHz is referred to as "superwideband" (SWB). In the BWE region, the human ear is not particularly sensitive to the phase of sound signals. It is, however, sensitive to the regularity of sound harmonics and to the presence and distribution of energy. Thus, processing BWE sound helps the speech sound more natural and also provides a sense of "presence."

DESCRIPTION

Figure 1:
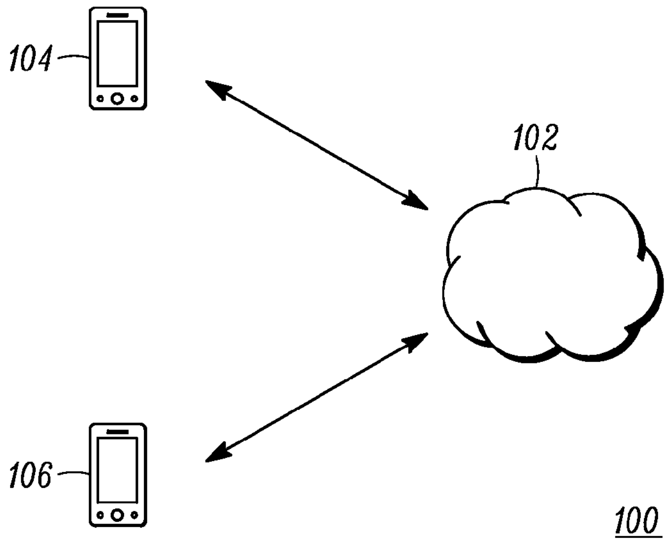
FIG. 1 depicts an example of a communication system in which various embodiments of the invention may be implemented.

An embodiment of the invention is directed to a hybrid encoder. When audio input received by the encoder changes from music-like sounds (e.g., music) to speech-like sounds (e.g., human speech), the encoder switches from a first mode (e.g., a music mode) to a second mode (e.g., a speech mode). In an embodiment of the invention, when the encoder operates in the first mode, it employs a first coder (e.g., a frequency domain coder, such as a harmonic-based sinusoidal-type coder). When the encoder switches to the second mode, it employs a second coder (e.g., a time domain or waveform coder, such as a CELP coder). This switch from the first coder to the second coder may cause delays in the encoding process, resulting in a gap in the encoded signal. To compensate, the encoder backfills the gap with a portion of the audio signal that occurs after the gap.

In a related embodiment of the invention, the second coder includes a BWE coding portion and a core coding portion.

The core coding portion may operate at different sample rates, depending on the bit rate at which the encoder operates. For example, there may be advantages to using lower sample rates (e.g., when the encoder operates at lower bit rates), and advantages to using higher sample rates (e.g., when the encoder operates at higher bit rates). The sample rate of the core portion determines the lowest frequency of the BWE coding portion. However, when the switch from the first coder to the second coder occurs, there may be uncertainty about the sample rate at which the core coding portion should operate. Until the core sample rate is known, the processing chain of the BWE coding portion may not be able to be configured, causing a delay in the processing chain of the BWE coding portion. As a result of this delay, a gap is created in the BWE region of the signal during processing (referred to as the "BWE target signal"). To compensate, the encoder backfills the BWE target signal gap with a portion of the audio signal that occurs after the gap.

In another embodiment of the invention, an audio signal switches from a first type of signal (such as a music or music-like signal), which is coded by a first coder (such as a frequency domain coder) to a second type of signal (such as a speech or speech-like signal), which is processed by a second coder (such as a time domain or waveform coder). The switch occurs at a first time. A gap in the processed audio signal has a time span that begins at or after the first time and ends at a second time. A portion of the processed audio signal, occurring at or after the second time, is copied and inserted into the gap, possibly after functions are performed on the copied portion (such as time-reversing, sine windowing, and/or cosine windowing).

The previously-described embodiments may be performed by a communication device, in which an input interface (e.g., a microphone) receives the audio signal, a speech-music detector determines that the switch from music-like to speech-like audio has occurred, and a missing signal generator backfills the gap in the BWE target signal. The various operations may be performed by a processor (e.g., a digital signal processor or DSP) in combination with a memory (including, for example, a look-ahead buffer).

In the description that follows, it is to be noted that the components shown in the drawings, as well as labeled paths, are intended to indicate how signals generally flow and are processed in various embodiments. The line connections do not necessarily correspond to the discrete physical paths, and the blocks do not necessarily correspond to discrete physical components. The components may be implemented as hardware or as software. Furthermore, the use of the term "coupled" does not necessarily imply a physical connection between components, and may describe relationships between components in which there are intermediate components. It merely describes the ability of components to communicate with one another, either physically or via software constructs (e.g., data structures, objects, etc.)

Turning to the drawings, an example of a network in which an embodiment of the invention operates will now be described. FIG. 1 illustrates a communication system 100, which includes a network 102. The network 102 may include many components such as wireless access points, cellular base stations, wired networks (fiber optic, coaxial cable, etc.) Any number of communication devices and many varieties of communication devices may exchange data (voice, video, web pages, etc.) via the network 102. A first and a second communication device 104 and 106 are depicted in FIG. 1 as communicating via the network 102. Although the first and second communication devices 104 and 106 are shown as being smartphones, they may be any type of communication device, including a laptop, a wireless local area network capable device, a wireless wide area network capable device, or User Equipment (UE). Unless stated otherwise, the first communication device 104 is considered to be the transmitting device while the second communication device 106 is considered to be the receiving device.

Figure 2:
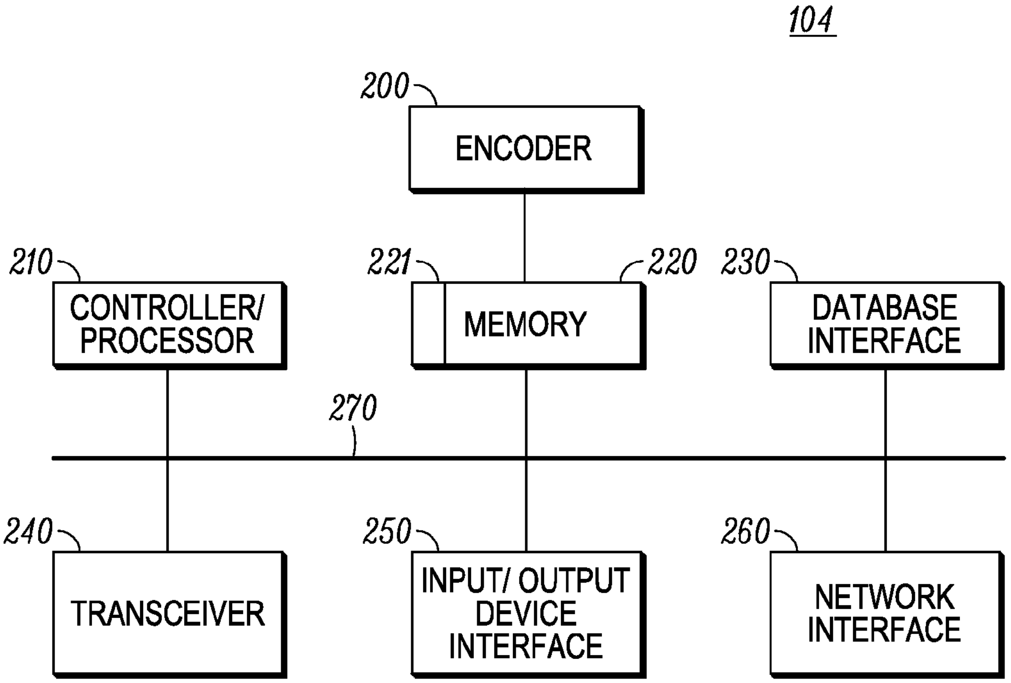
FIG. 2 shows a block diagram depicting a communication device in accordance with an embodiment of the invention.

FIG. 2 illustrates in a block diagram of the communication device 104 (from FIG. 1) according to an embodiment of the invention. The communication device 104 may be capable of accessing the information or data stored in the network 102 and communicating with the second communication device 106 via the network 102. In some embodiments, the communication device 104 supports one or more communication applications. The various embodiments described herein may also be performed on the second communication device 106.

The communication device 104 may include a transceiver 240, which is capable of sending and receiving data over the network 102. The communication device may include a controller/processor 210 that executes stored programs, such as an encoder 222. Various embodiments of the invention are carried out by the encoder 222. The communication device may also include a memory 220, which is used by the controller/processor 210. The memory 220 stores the encoder 222 and may further include a look-ahead buffer 221, whose purpose will be described below in more detail. The communication device may include a user input/output interface 250 that may comprise elements such as a keypad, display, touch screen, microphone, earphone, and speaker. The communication device also may include a network interface 260 to which additional elements may be attached, for example, a universal serial bus (USB) interface. Finally, the communication device may include a database interface 230 that allows the communication device to access various stored data structures relating to the configuration of the communication device.

According to an embodiment of the invention, the input/output interface 250 (e.g., a microphone thereof) detects audio signals. The encoder 222 encodes the audio signals. In doing so, the encoder employs a technique known as "look-ahead" to encode speech signals. Using look-ahead, the encoder 222 examines a small amount of speech in the future of the current speech frame it is encoding in order to determine what is coming after the frame. The encoder stores a portion of the future speech signal in the look-ahead buffer 221

Referring to the block diagram of FIG. 3, the operation of the encoder 222 (from FIG. 2) will now be described. The encoder 222 includes a speech/music detector 300 and a switch 320 coupled to the speech/music detector 300. To the right of those components as depicted in FIG. 2, there is a first coder 300*a* and a second coder 300*b*. In an embodiment of the invention, the first coder 300*a* is a frequency domain coder (which may be implemented as a harmonic-based sinusoidal coder) and the second set of components constitutes a time domain or waveform coder such as a CELP coder 300*b*. The first and second coders 300*a* and 300*b* are coupled to the switch 320.

The second coder 300*b* may be characterized as having a high-band portion, which outputs a BWE excitation signal (from about 7 kHz to about 16 kHz) over paths O and P, and low-band portion, which outputs a WB excitation signal (from about 50 Hz to about 7 kHz) over path N. It is to be understood that this grouping is for convenient reference only. As will be discussed, the high-band portion and the low-band portion interact with one another.

The high-band portion includes a bandpass filter 301, a spectral flip and down mixer 307 coupled to the bandpass filter 301, a decimator 311 coupled to the spectral flip and down mixer 307, a missing signal generator 311*a* coupled to the decimator 311, and a Linear Predictive Coding (LPC) analyzer 314 coupled to the missing signal generator 311*a*. The high-band portion 300*a* further includes a first quantizer 318 coupled to the LPC analyzer 314. The LPC analyzer may be, for example, a $10^{th}$ order LPC analyzer.

Figure 3:
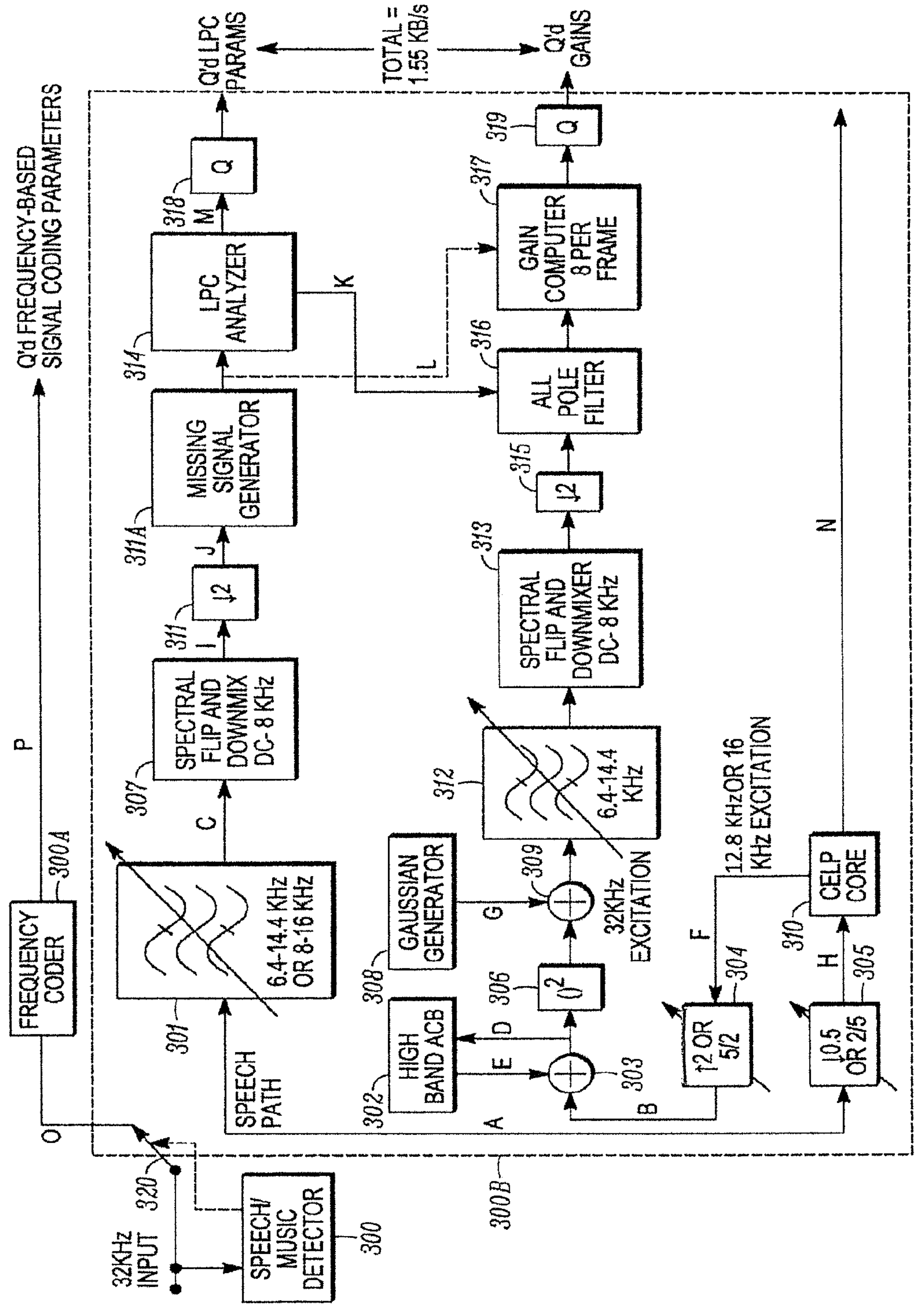
FIG. 3 shows a block diagram depicting an encoder in an embodiment of the invention.

Referring still to FIG. 3, the high-band portion of the second coder 300*b* also includes a high band adaptive code book (ACB) 302 (or, alternatively, a long-term predictor), an adder 303 and a squaring circuit 306. The high band ACB 302 is coupled to the adder 303 and to the squaring circuit 306. The high-band portion further includes a Gaussian generator 308, an adder 309 and a bandpass filter 312. The Gaussian generator 308 and the bandpass filter 312 are both coupled to the adder 309. The high-band portion also includes a spectral flip and down mixer 313, a decimator 315, a 1/A(z) all-pole filter 316 (which will be referred to as an "all-pole filter"), a gain computer 317, and a second quantizer 319. The spectral flip and down mixer 313 is coupled to the bandpass filter 312, the decimator 315 is coupled to the spectral flip and down mixer 313, the all-pole filter 316 is coupled to the decimator 315, and the gain computer 317 is coupled to both the all-pole filter 316 and to the quantizer. Additionally, the all-pole filter 316 is coupled to the LPC analyzer 314.

The low-band portion includes an interpolator 304, a decimator 305, and a Code-Excited Linear Prediction (CELP) core codec 310. The interpolator 304 and the decimator 305 are both coupled to the CELP core codec 310.

The operation of the encoder 222 according to an embodiment of the invention will now be described. The speech/music detector 300 receives audio input (such as from a microphone of the input/output interface 250 of FIG. 2). If the detector 300 determines that the audio input is music-type audio, the detector controls the switch 320 to switch to allow the audio input to pass to the first coder 300*a*. If, on the other hand, the detector 300 determines that the audio input is speech-type audio, then the detector controls the switch 320 to allow the audio input to pass to the second coder 300*b*. If, for example, a person using the first communication device 104 is in a location having background music, the detector 300 will cause the switch 320 to switch the encoder 222 to use the first coder 300*a* during periods where the person is not talking (i.e., the background music is predominant). Once the person begins to talk (i.e., the speech is predominant), the detector 300 will cause the switch 320 to switch the encoder 222 to use the second coder 300*b*.

The operation of the high-band portion of the second coder 300*b* will now be described with reference to FIG. 3. The bandpass filter 301 receives a 32 kHz input signal via path A. In this example, the input signal is a super-wideband (SWB) signal sampled at 32 KHz. The bandpass filter 301 has a lower frequency cut-off of either 6.4 kHz or 8 kHz and has a bandwidth of 8 kHz. The lower frequency cut-off of the bandpass filter 301 is matched to the high frequency cut-off of the CELP core codec 310 (e.g., either 6.4 KHz or 8 KHz). The bandpass filter 301 filters the SWB signal, resulting in a band-limited signal over path C that is sampled at 32 kHz and has a bandwidth of 8 kHz. The spectral flip & down mixer 307 spectrally flips the band-limited input signal received over path C and spectrally translates the signal down in frequency such that the required band occupies the region from 0 Hz-8 kHz. The flipped and down-mixed input signal is provided to the decimator 311, which band limits the flipped and down-mixed signal to 8 kHz, reduces the sample rate of the flipped and down-mixed signal from 32 kHz to 16 kHz, and outputs, via path J, a critically-sampled version of the spectrally-flipped and band-limited version of the input signal, i.e., the BWE target signal. The sample rate of the signal is on path J is 16 kHz. This BWE target signal is provided to the missing signal generator 311*a*.

The missing signal generator 311*a* fills the gap in the BWE target signal that results from the encoder 222 switching between the first coder 300*a* and the CELP-type encoder 300*b*. This gap-filling process will be described in more detail with respect to FIG. 4. The gap-filled BWE target signal is provided to the LPC analyzer 314 and to the gain computer 317 via path L. The LPC analyzer 314 determines the spectrum of the gap-filled BWE target signal and outputs LPC Filter Coefficients (unquantized) over path M. The signal over path M is received by the quantizer 318, which quantizes the LPC coefficients, including the LPC parameters. The output of the quantizer 318 constitutes quantized LPC parameters.

Referring still to FIG. 3, the decimator 305 receives the 32 kHz SWB input signal via path A. The decimator 305 band-limits and resamples the input signal. The resulting output is either a 12.8 kHz or 16 kHz sampled signal. The band-limited and resampled signal is provided to the CELP core codec 310. The CELP core codec 310 codes the lower 6.4 or 8 kHz of the band-limited and resampled signal, and outputs a CELP core stochastic excitation signal component ("stochastic codebook component") over paths N and F. The interpolator 304 receives the stochastic codebook component via path F and upsamples it for use in the high-band path. In other words, the stochastic codebook component serves as the high-band stochastic codebook component. The upsampling factor is matched to the high frequency cutoff of the CELP Core codec such that the output sample rate is 32 kHz. The adder 303 receives the upsampled stochastic codebook component via path B, receives an adaptive codebook component via path E, and adds the two components. The total of the stochastic and the adaptive codebook components is used to update the state of the ACB 302 for future pitch periods via path D.

Referring again to FIG. 3, the high-band ACB 302 operates at the higher sample rate and recreates an interpolated and extended version of the excitation of the CELP core 310, and may be considered to mirror the functionality of the CELP core 310. The higher sample rate processing creates harmonics that extend higher in frequency than those of the CELP core due to the higher sample rate. To achieve this, the high-band ACB 302 uses ACB parameters from the CELP core 310 and operates on the interpolated version of the CELP core stochastic excitation component. The output of the ACB 302 is added to the up-sampled stochastic codebook component to create an adaptive codebook component. The ACB 302 receives, as an input, a total of the stochastic and adaptive codebook components of the high-band excitation signal over path D. This total, as previously noted, is provided from the output of the addition module 303.

The total of the stochastic and adaptive components (path D) is also provided to the squaring circuit 306. The squaring circuit 306 generates strong harmonics of the core CELP signal to form a bandwidth-extended high-band excitation signal, which is provided to the mixer 309. The Gaussian generator 308 generates a shaped Gaussian noise signal, whose energy envelope matches that of the bandwidth-extended high-band excitation signal that was output from the squaring circuit 306. The mixer 309 receives the noise signal from the Gaussian generator 308 and the bandwidth-extended high-band excitation signal from the squaring circuit 306 and replaces a portion of the bandwidth-extended high-band excitation signal with the shaped Gaussian noise signal. The portion that is replaced is dependent upon the estimated degree of voicing, which is an output from the CELP core and is based on the measurements of the relative energies in the stochastic component and the active codebook component. The mixed signal that results from the mixing function is provided to the bandpass filter 312. The bandpass filter 312 has the same characteristics as that of the bandpass filter 301, and extracts the corresponding components of the high-band excitation signal.

The bandpass-filtered high-band excitation signal, which is output by the bandpass filter 312, is provided to the spectral flip and down-mixer 313. The spectral flip and down-mixer 313 flips the bandpass-filtered high-band excitation signal and performs a spectral translation down in frequency, such that the resulting signal occupies the frequency region from 0 Hz to 8 kHz. This operation matches that of the spectral flip and down-mixer 307. The resulting signal is provided to the decimator 315, which band-limits and reduces the sample rate of the flipped and down-mixed high-band excitation signal from 32 kHz to 16 kHz. This operation matches that of the decimator 311. The resulting signal has a generally flat or white spectrum but lacks any formant information The all-pole filter 316 receives the decimated, flipped and down-mixed signal from the decimator 314 as well as the unquantized LPC filter coefficients from the LPC analyzer 314. The all-pole filter 316 reshapes the decimated, flipped and down-mixed high-band signal such that it matches that of the BWE target signal. The reshaped signal is provided to the gain computer 317, which also receives the gap-filled BWE target signal from the missing signal generator 311*a* (via path L). The gain computer 317 uses the gap-filled BWE target signal to determine the ideal gains that should be applied to the spectrally-shaped, decimated, flipped and down-mixed high-band excitation signal. The spectrally-shaped, decimated, flipped and down-mixed high-band excitation signal (having the ideal gains) is provided to the second quantizer 319, which quantizes the gains for the high band. The output of the second quantizer 319 is the quantized gains. The quantized LPC parameters and the quantized gains are subjected to additional processing, transformations, etc., resulting in radio frequency signals that are transmitted, for example, to the second communication device 106 via the network 102.

Figure 4:
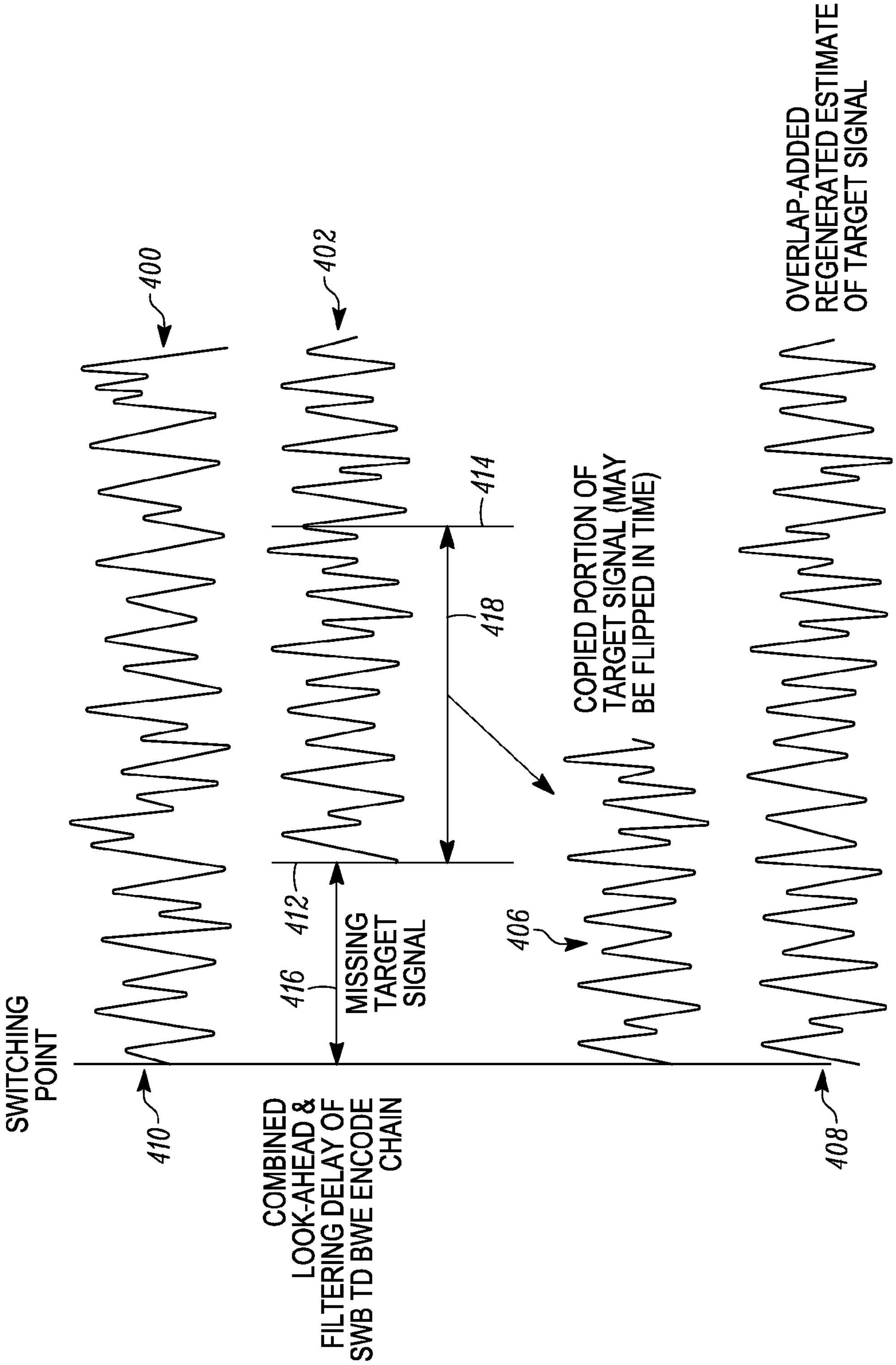
FIGS. 4 and 5 depict examples of gap-filling according to various embodiments of the invention.

As previously noted, the missing signal generator 311*a* fills the gap in the signal resulting from the encoder 222 changing from a music mode to a speech mode. The operation performed by the missing signal generator 311*a* according to an embodiment of the invention will now be described in more detail with respect to FIG. 4. FIG. 4 depicts a graph of signals 400, 402, 404, and 408. The vertical axis of the graph represents the magnitude of the signals and horizontal axis represents time. The first signal 400 is the original sound signal that the encoder 222 is attempting to process. The second signal 402 is a signal that results from processing the first signal 400 in the absence of any modification (i.e., an unmodified signal). A first time 410 is the point in time at which the encoder 222 switches from a first mode (e.g., a music mode, using a frequency domain coder, such as a harmonic-based sinusoidal-type coder) to a second mode (e.g., a speech mode, using a time domain or waveform coder, such as a CELP coder). Thus, until the first time 410, the encoder 222 processes the audio signal in the first mode. At or shortly after the first time 410, the encoder 222 attempts to process the audio signal in the second mode, but is unable to effectively do so until the encoder 222 is able to flush-out the filter memories and buffers after the mode switch (which occurs at a second time 412) and fill the look-ahead buffer 221. As can be seen, there is an interval of time between the first time 410 and the second time 412 in which there a gap 416 (which, for example, may be around 5 milliseconds) in the processed audio signal. During this gap 416, little or no sound in the BWE region is available to be encoded. To compensate for this gap, the missing signal generator 311*a* copies a portion 406 of the signal 402. The copied signal portion 406 is an estimate of the missing signal portion (i.e., the signal portion that should have been in the gap). The copied signal portion 406 occupies a time interval 418 that spans from the second time 412 to a third time 414. It is to be noted that there may be multiple portions of the of the signal post-second time 412 that may be copied, but this example is directed to a single copied portion.

The encoder 222 superimposes the copied signal portion 406 onto the regenerated signal estimate 408 so that a portion of the copied signal portion 406 is inserted into the gap 416. In some embodiments, the missing signal generator 311*a* time-reverses the copied signal portion 406 prior to superimposing it onto the regenerated signal estimate 402, as shown in FIG. 4.

In an embodiment, the copied portion 406 spans a greater time period than that of the gap 416. Thus, in addition to the copied portion 406 filling the gap 416, part of the copied portion is combined with the signal beyond the gap 416. In other embodiments, the copied portion is spans the same period of time as the gap 416.

Figure 5:
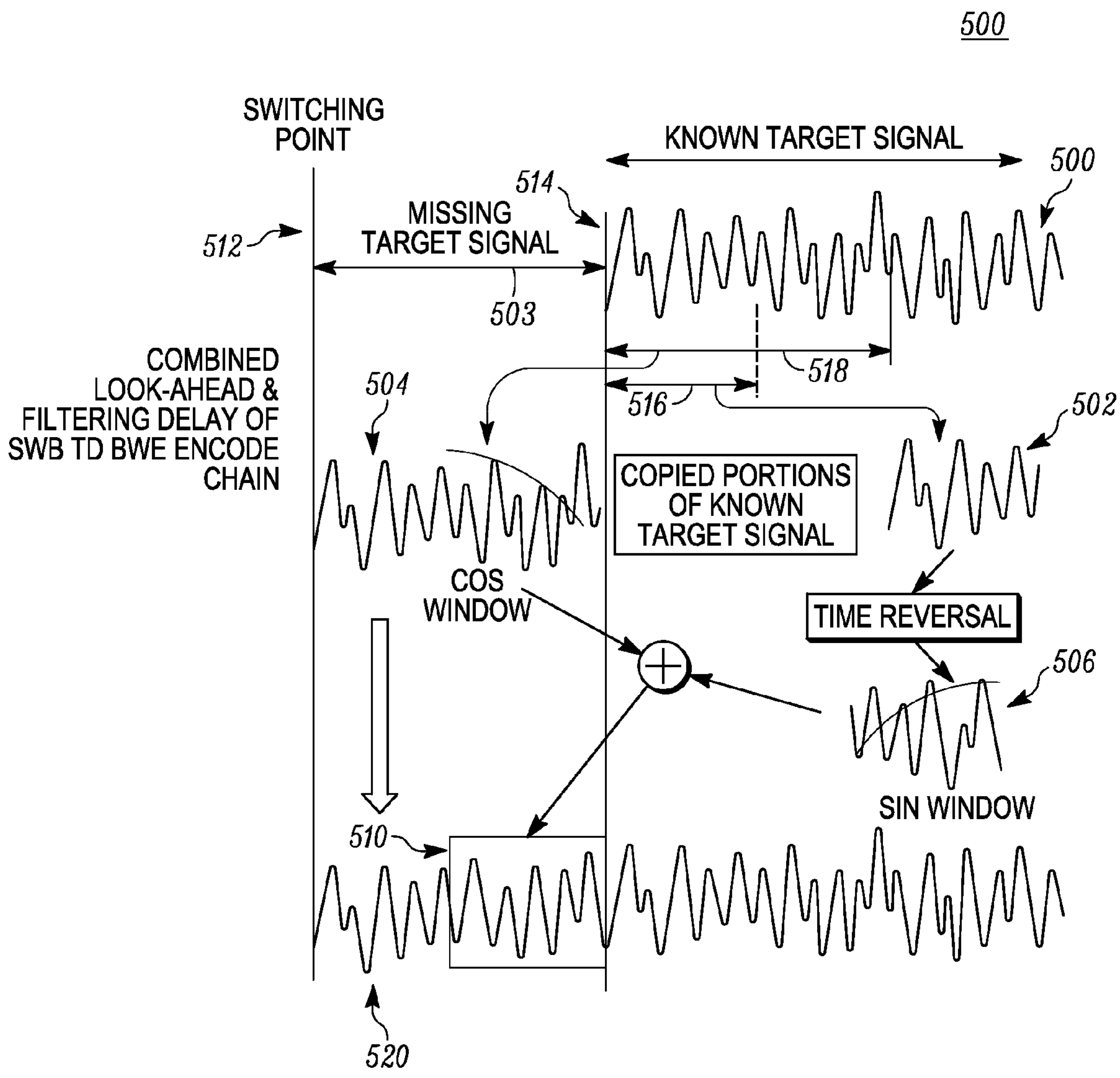

FIG. 5 shows another embodiment. In this embodiment, there is a known target signal 500, which is the signal resulting from the initial processing performed by the encoder 222. Prior to a first time 512, the encoder 222 operates in a first mode (in which, for example, it uses a frequency coder, such as a harmonic-based sinusoidal-type coder). At the first time 512, the encoder 222 switches from the first mode to a second mode (in which, for example, it uses a CELP coder). This switching is based, for example, on the audio input to the communication device changing from music or music-like sounds to speech or speech-like sounds. The encoder 222 is not able to recover from the switch from the first mode to the second mode until a second time 514. After the second time 514, the encoder 222 is able to encode the speech input in the second mode. A gap 503 exists between first time and the second time. To compensate for the gap 503, the missing signal generator 311*a* (FIG. 3) copies a portion 504 of the known target signal 500 that is the same length of time 518 as the gap 503. The missing signal generator combines a cosine window portion 502 of the copied portion 504 with a time-reversed sine window portion 506 of the copied portion 504. The cosine window portion 502 and the time-reversed sine window portion 506 may both be taken from the same section 516 of the copied portion 504. The time-reversed sine and cosine portions may be out of phase with respect to one another, and may not necessarily begin and end at the same points in time of the section 516. The combination of the cosine window and the time reversed sine window will be referred to as the overlap-add signal 510. The overlap-add signal 510 replaces a portion of the copied portion 504 of the target signal 500. The portion of the copied signal 504 that has not been replaced will be referred as the non-replaced signal 520. The encoder appends the overlap-add signal 510 to non-replaced signal 516, and fills the gap 503 with the combined signals 510 and 516.

While the present disclosure and the best modes thereof have been described in a manner establishing possession by the inventors and enabling those of ordinary skill to make and use the same, it will be understood that there are equivalents to the exemplary embodiments disclosed herein and that modifications and variations may be made thereto without departing from the scope and spirit of the disclosure, which are to be limited not by the exemplary embodiments but by the appended claims.

What is claimed is:

1. A method of encoding an audio signal the method comprising: processing the audio signal in a first encoder mode;

switching from the first encoder mode to a second encoder mode at a first time;

processing the audio signal in the second encoder mode, wherein a processing delay of the second mode creates a gap in the audio signal having a time span that begins at or after the first time and ends at a second time;

copying a portion of the processed audio signal wherein the copied portion occurs at or after the second time; and inserting a signal into the gap, wherein the inserted signal is based on the copied portion, wherein the copied portion comprises a time-reversed sine window portion and a cosine window portion, wherein inserting the copied portion comprises combining the time-reversed sine window portion with the cosine window portion, and inserting at least part of the combined sine and cosine window portions into the gap portion.

2. The method of claim 1, wherein the time span of the copied portion is longer than the time span of the gap, the method further comprising combining an overlapping part of the copied portion with at least part of the processed audio signal that occurs after the second time.

3. The method of claim 1, wherein switching the encoder from a first mode to a second mode comprises switching the encoder from a music mode to a speech mode.

4. The method of claim 1, wherein the steps are performed on a first communication device, the method further comprising:

following the inserting step, transmitting the encoded speech signal to a second device.

5. The method of claim 1, further comprising:

if the audio signal is determined to be a music signal encoding the audio signal in the first mode;

determining that the audio signal has switched from the music signal to a speech signal;

if it is determined that the audio signal has switched to be a speech signal encoding the audio signal in the second mode.

6. The method of claim 5, wherein the first mode is a music coding mode and the second mode is a speech coding mode.

7. The method of claim 1, further comprising using a frequency domain coder in the first mode and using a CELP coder in the second mode.

8. An apparatus for encoding an audio signal the apparatus comprising:

an encoder having a processor configured to act as a first coder;

a second coder;

a speech-music detector, wherein when the speech-music detector determines that an audio signal has changed from music to speech, the audio signal ceases to be processed by the first coder and is processed by the second coder;

wherein a processing delay of the second coder creates a gap in the audio signal having a time span that begins at or after the first time and ends at a second time; and a missing signal generator that copies a portion of the processed audio signal wherein the copied portion occurs at or after the second time and inserts a signal based on the copied portion into the gap, wherein the copied portion comprises a time-reversed sine window portion and a cosine window portion, wherein inserting the copied portion comprises combining the time-reversed sine windowed portion with the cosine windowed portion, and inserting at least part of the combined sine and cosine windowed portions into the gap portion.

9. The apparatus of claim 8, wherein the signal output by the missing signal generator is a gap-filled bandwidth extension target signal the apparatus further comprising a gain computer that uses the gap-filled bandwidth extension target signal to determine ideal gains for at least part of the audio signal.

10. The apparatus of claim 8, wherein the time span of the copied portion is longer than the time span of the gap, the method further comprising combining an overlapping part of the copied portion with at least part of the processed audio signal that occurs after the second time.

11. The apparatus of claim 8, wherein the signal output by the missing signal generator is a gap-filled bandwidth extension target signal the apparatus further comprising a linear predictive coding analyzer that determines the spectrum of the gap-filled bandwidth extension target signal and, based on the determined spectrum, outputs linear predictive coding coefficients.

12. The apparatus of claim 8, wherein the first coder is a frequency domain coder and the second coder is a CELP coder.

* * * * *